United States Patent

Vandenbergh et al.

[11] Patent Number: 5,980,747
[45] Date of Patent: Nov. 9, 1999

[54] STORAGE STABLE PSEUDOMONAS COMPOSITIONS AND METHOD OF USE THEREOF

[75] Inventors: Peter A. Vandenbergh, Sarasota; Blair S. Kunka, Bradenton; Hiren K. Trivedi, Tampa, all of Fla.

[73] Assignee: Osprey Biotechnics, Inc., Oneco, Fla.

[21] Appl. No.: 08/819,855

[22] Filed: Mar. 17, 1997

[51] Int. Cl.$^6$ .................................. C02F 3/34; C12N 1/20
[52] U.S. Cl. ................. 210/611; 435/252.34; 435/253.3; 435/262.5; 435/877
[58] Field of Search ..................... 210/610, 611, 210/631; 435/252.34, 253.3, 247–250, 262.5, 281, 876, 877

[56] References Cited

U.S. PATENT DOCUMENTS

| | | | |
|---|---|---|---|
| 3,963,576 | 6/1976 | Horsfall et al. | 195/59 |
| 4,288,545 | 9/1981 | Spraker | 435/253.3 |
| 4,391,887 | 7/1983 | Baumgarten et al. | 435/42 |
| 4,508,824 | 4/1985 | Olsen | 435/874 |
| 4,672,037 | 6/1987 | Daggett | 435/253 |
| 4,673,505 | 6/1987 | Wong | 210/611 |
| 4,800,158 | 1/1989 | Vanderbergh | 210/611 |
| 4,822,490 | 4/1989 | Dyadechko et al. | 210/611 |
| 4,870,012 | 9/1989 | Vanderbergh | 210/611 |
| 4,910,143 | 3/1990 | Vandenbergh | 435/252.34 |
| 4,970,000 | 11/1990 | Eppler et al. | 210/611 |
| 4,981,800 | 1/1991 | Inoue et al. | 435/253.3 |
| 4,985,363 | 1/1991 | Inoue et al. | 435/253.3 |
| 5,494,580 | 2/1996 | Baskys et al. | 210/611 |
| 5,821,112 | 10/1998 | Botto et al. | 435/262.5 |

*Primary Examiner*—Thomas G. Wyse
*Attorney, Agent, or Firm*—Ian C. McLeod

[57] ABSTRACT

A composition and method for preserving Pseudomonads is described. The composition includes an alkali metal nitrate, and optionally monoammonium phosphate as a buffer in an aqueous solution to preserve the bacteria. The compositions are useful for bioremediation.

20 Claims, No Drawings

STORAGE STABLE PSEUDOMONAS COMPOSITIONS AND METHOD OF USE THEREOF

BACKGROUND OF THE INVENTION

1. Summary of the Invention

The present invention relates to room temperature, storage stable, aqueous Pseudomonas compositions and a method of the use of such compositions for degradation of a biodegradable material, such as oil and grease. In particular, the present invention relates to such compositions which are stable for long periods at room temperature prior to use. The compositions can be used for bioremediation in the environment or in a bioreactor.

2. Description of Related Art

The use of Pseudomonads for remediation by degradation of biodegradable materials is very well known. Illustrative of the patent art are U.S. Pat. Nos. 3,963,576 to Horsfall et al; 4,391,887 to Baumgarten et al; 4,508,824 to Olsen; 4,672,037 to Daggett; 4,673,505 to Wong; 4,822,490 to Dyadechko et al; 4,910,143 to Vandenbergh; 4,970,000 to Eppler et al and 5,494,580 to Baskys et al.

There is a significant need for liquid Pseudomonad compositions which are storage stable over a long period of time at room temperatures (25° C.). Generally the Pseudomonad compositions are dried, such as by lyophilization, or frozen with preservatives. In either case there is a significant die-off of the bacteria over time (usually about 75% by cell count) due to the preservation. Further, the cultures generally need to be reactivated in a bulk starter medium in order to increase the number and viability of the cells. The use of a bulk starter media for this purpose is well known to those skilled in the art.

It would be highly desirable to have an aqueous Pseudomonad composition which is storage stable at room temperatures for storage, shipment and use and yet immediately active without the use of a bulk starter. Further, there is a need for an aqueous Pseudomonad composition which is inexpensive to produce.

OBJECTS

It is therefore an object of the present invention to provide an aqueous Pseudomonad composition which is stable over long periods of time at room temperatures and which is immediately effective for bioremediation particularly to degrade a biodegradable material. Further, it is an object of the present invention to provide an aqueous Pseudomonad composition which is inexpensive to prepare. These and other objects will become increasingly apparent by reference to the following description.

DESCRIPTION OF PREFERRED EMBODIMENTS

The present invention relates to an aqueous composition containing a live bacterium of the genus Pseudomonas useful for degradation of a biodegradable material which consists essentially of water; at least one species of the Pseudomonas bacterium at between about $10^6$ and $10^{10}$ CFU per ml of the water; and an alkali metal nitrate in an amount between about 0.1 and 5% by weight of the water, and optionally a buffering amount of monoammonium phosphate, so that the bacterium are preserved in living form at 25° C.

Further, the present invention relates to a method for degradation of a biodegradable material which comprises: providing a composition which consists essentially of water; at least one species of the Pseudomonas bacterium at between about $10^6$ and $10^{10}$ CFU per ml of the water; and an alkali metal nitrate in an amount between about 0.1 and 5% by weight of the water, and optionally a buffering amount of monoammonium phosphate, so that the bacterium are preserved in living form at 25° C.; holding the composition at a temperature between about 8 and 35° C. to provide a preserved bacterium; inoculating the preserved bacterium into the biodegradable material; and degrading the biodegradable material with the preserved bacterium.

Optionally monoammonium phosphate is used as a buffer. It is preferably used in a weight ratio between about 1:1 and 125:1 alkali metal nitrate to monoammonium phosphate.

The preferred Pseudomonads are *Pseudomonas putida* NRRL-B-18118 and NRRL-B-15078 and *Pseudomonas fluorescens*. These cultures are described in U.S. Pat. No. 4,910,143 to Vandenbergh and U.S. Pat. No. 4,508,824 to Olsen. They are freely available upon request by name and deposit number from the Northern Regional Research Laboratory (NRRL), Peoria, Ill. *Pseudomonas fluorescens* was deposited with the NRRL under the Budapest Treaty on Feb. 21, 1997, as NRRL-B-21658. This culture is also freely available upon request by name and deposit number.

The invention is characterized by the unexpected finding that low levels of an alkali metal nitrate, particularly sodium or potassium nitrate, alone are sufficient to preserve the bacterial counts over a period of up to 160 days or longer at room temperatures. The compositions can be maintained between about 8 to 35° C. for the storage. The amount of the alkali metal nitrate used is between about 0.1 and 5% by weight of the water. The culture contains between about $10^6$ and $10^{10}$ cell forming units (CFU) per ml which is more than sufficient for the usual bioremediation.

The bioremediation can be conducted in a bioreactor or in the environment. In either event the composition is admixed with the soil, water, or the like waste or by-product material. At that point a carbon source (organic compound), nitrogen, vitamin and mineral sources can also added to facilitate the bioremediation. This can compensate for the differences in the composition of biodegradable material being treated. The composition can also be used for degradation of nitrates.

The mechanism of the preservation is not understood. The nitrate provides an electron source for the bacteria so that the nitrate is degraded to nitrogen according to the formula:

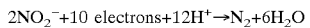

$$2NO_2^- + 10 \text{ electrons} + 12H^+ \rightarrow N_2 + 6H_2O$$

Normal tap water is slightly acidic ($H_3O^+$) and can provide the $H^+$ ions. If necessary small amounts of acid can be added. In any event, the pH is preferably between pH 6 and 7. The alkali metal can be sodium or potassium.

The following Examples show the storage stability and use of the compositions of the present invention.

EXAMPLE 1

Sodium nitrate was mixed with water in an amount of 0.26 gm per 100 gm (ml) of water. This produced a 0.26% solution by weight. A control contained only water.

The bacteria (*Pseudomonas putida*) NRRL 18,118 and NRRL 15078 and *Pseudomonas fluorescens* in equal volumes) were added to the two bottles (control Bottle 1 and sodium nitrate Bottle 2). The results are shown in Table 1

TABLE 1

| Day | Bottle 1 | Bottle 2 |
| --- | --- | --- |
| 0 | $2.5 \times 10^8$* | $2.5 \times 10^8$ |
| 14 | $6.0 \times 10^7$ | $2.0 \times 10^8$ |
| 21 | $5.0 \times 10^7$ | $2.0 \times 10^8$ |
| 28 | $9.0 \times 10^6$* | $1.8 \times 10^8$ |

*CFU/ml

As can be seen, the control culture had a significant drop-off of cells after 28 days (96.4%) whereas the culture with the sodium nitrate experienced a much smaller drop off (38%). This culture can be used for bioremediation.

EXAMPLE 2

This Example 2 shows the effect of sodium nitrate with monoammonium phosphate and the culture of Example 1 as a buffer as shown in Table 2.

TABLE 2

Effect of Nitrate on Shelf Life of Liquid Product

| INGREDIENT | Bottle 1 | Bottle 2 | Bottle 3 | Bottle 4 |
| --- | --- | --- | --- | --- |
| Water (ml) | 100 | 100 | 100 | 100 |
| Sodium Nitrate (g) | 0.52 | 0.13 | 1.04 | 0.26 |
| Mono Ammonium Phosphate (g) | 0.04 | 0.04 | 0.04 | 0.04 |

| INGREDIENT | Bottle 5 | Bottle 6 | Bottle 7 | Bottle 8 |
| --- | --- | --- | --- | --- |
| Water (ml) | 100 | 100 | 100 | 100 |
| Sodium Nitrate (g) | 2.5 | 4.0 | 5.0 | 7.5 |
| Mono Ammonium Phosphate (g) | 0.04 | 0.04 | 0.04 | 0.04 |

As can be seen, the cultures are stable for at least 28 days. The culture in Bottle 4 increased in number and thus is preferred. The results are shown in Table 3.

TABLE 3

Lower Level of Sodium Nitrate, Impact on Product Stability

| | Bottle 1 | Bottle 2 | Bottle 3 | Bottle 4 |
| --- | --- | --- | --- | --- |
| Day 0 | $3.4 \times 10^8$ | $1.8 \times 10^8$ | $5.2 \times 10^8$ | $2.2 \times 10^8$ |
| Day 8 | $3.8 \times 10^8$ | $2.2 \times 10^8$ | $2.9 \times 10^8$ | $2.3 \times 10^8$ |
| Day 16 | $2.3 \times 10^8$ | $3.3 \times 10^8$ | $3.2 \times 10^8$ | $3.2 \times 10^8$ |
| Day 28 | $4.6 \times 10^8$ | $2.3 \times 10^8$ | $2.5 \times 10^8$ | $2.8 \times 10^8$ |

| | Bottle 5 | Bottle 6 | Bottle 7 | Bottle 8 |
| --- | --- | --- | --- | --- |
| Day 0 | $1.25 \times 10^8$* | $1.45 \times 10^8$ | $1.35 \times 10^8$ | $1.35 \times 10^8$ |
| Day 7 | $3.0 \times 10^8$ | $1.0 \times 10^8$ | $2.8 \times 10^7$ | $<10^6$ |
| Day 13 | $2.0 \times 10^8$ | $1.2 \times 10^7$ | $5.0 \times 10^7$ | $<10^4$ |
| Day 27 | $1.9 \times 10^8$ | $1.0 \times 10^7$ | $3.0 \times 10^7$ | $<10^4$ |

*CFU/ml

EXAMPLE 3

An aqueous culture having the composition set forth in Bottle 4 of Example 2 was used to reduce oil and grease from a restaurant in water. The culture was stored for 28 days at room temperature prior to use at $1 \times 10^6$ cells per ml. The results are shown in Table 4.

TABLE 4

| Time Hours | Oil and Grease ppm |
| --- | --- |
| 0 | 880 |
| 24 | 355 |
| 48 | 250 |

A 13.13 mg/liter per hour reduction in oil and grease. There was a 71.6k reduction after 48 hours.

The procedure used for the analysis of oil and grease was a modified Partition-Gravimetric (L-L Extraction) method for oil and grease content in wastewater samples (Ref: *Standard Methods for the examination of water and wastewater,* 17th edition, (1989)). The dissolved or emulsified oil and grease is extracted from water by intimate contact with trichloroethane. The apparatus uses a 1-L separatory funnel, a 50 ml glass beaker and a water bath. The reagents are hydrochloric acid and trichloroethane. The procedure is to collect about 500 ml-1 L of sample in a sample bottle. Acidify to pH 2 or lower with HCl for preserving the sample, if necessary; transfer the sample to the separatory funnel; carefully rinse the sample bottle with 30 ml trichloroethane and add the solvent washing to the funnel; shake vigorously for 2 minutes and let layers separate; drain the solvent layer through the stopcock into a clean, tared glass beaker. Extract twice more with solvent if necessary; distill solvent from the glass beaker using a water bath at 70° C.; and cool the product for 30 minutes and weigh. If the organic solvent is free of residue, the gain in weight of the tared beaker is mainly due to oil and grease. The amount is based upon the percentage. As a control, when 100 ml sample of tap-water were dosed with 100 mg of olive oil, recovery of the added oil was 92%.

It is intended that the foregoing description be only illustrative of the present invention and that the present invention be limited only by the hereinafter appended claims.

We claim:

1. An aqueous composition containing a live bacterium of the genus Pseudomonas useful for degradation of biodegradable material which comprises (a) water;

(b) at least one species of the Pseudomonas bacterium at between about $10^6$ and $10^{10}$ CFU per ml of the water, wherein the Pseudomonas bacterium are selected from the group consisting of *Pseudomonas putida* deposited as NRRL-B-18118, NRRL-B-15078 and mixtures thereof; and (c) an alkali metal nitrate in an amount between about 0.1 and 5% by weight of the water and optionally a buffering amount of monoammonium phosphate so that the bacterium is preserved in living form at 25° C.

2. The composition of claim 1 wherein the alkali metal is sodium.

3. The composition of claim 1 wherein a *Pseudomonas fluorescens* is provided in the mixture of the *Pseudomonas putida*.

4. The composition of claim 3 wherein the *Pseudomonas fluorescens* is deposited as NRRL-B-21658.

5. The composition of claim 1 wherein the monoammonium phosphate is included in a weight ratio between about 1 to 1 and 125:1 alkali metal nitrate to monoammonium phosphate.

6. A method for degradation of a biodegradable material which comprises:

(a) providing a composition which consists essentially of
  (1) water;
  (2) at least one species of the Pseudomonas bacterium at between about $10^6$ and $10^{10}$ CFU per ml of the water, wherein the Pseudomonas bacterium are selected from the group consisting of *Pseudomonas putida* deposited as NRRL-B-18118, NRRL-B-15078 and mixtures thereof; and
  (3) an alkali metal nitrate in an amount between about 0.1 and 5% by weight of the water and optionally a buffering amount of monoammonium phosphate, so that the bacterium is preserved in living form at 25° C.;
(b) holding the composition at a temperature between about 8 and 35° C. to provide a preserved bacterium;
(c) inoculating the preserved bacterium into the biodegradable material; and
(d) degrading the biodegradable material with the preserved bacterium.

7. The method of claim 6 wherein the alkali metal is sodium.

8. The method of claim 6 wherein a *Pseudomonas fluorescens* is provided in the mixture of the *Pseudomonas putida*.

9. The method of claim 8 wherein the *Pseudomonas fluorescens* is deposited as NRRL-B-21658.

10. The method of claim 6 wherein the biodegradable material is in an organic waste.

11. The method of claim 10 wherein the organic waste is in the environment.

12. The method of claim 6 wherein the monoammonium phosphate is included in a weight ratio between about 1 to 1 and 125:1 alkali metal nitrate to monoammonium phosphate.

13. An aqueous composition containing a live bacterium of the genus Pseudomonas useful for degradation of biodegradable material which consists essentially of
  (a) water;
  (b) at least one species of the Pseudomonas bacterium at between about $10^6$ and $10^{10}$ CFU per ml of the water; and
  (c) an alkali metal nitrate in an amount between about 0.1 and 5% by weight of the water and a buffering amount of monoammonium phosphate so that the bacterium is preserved in living form at 25° C., wherein the monoammonium phosphate is included in a weight ratio between about 1 to 1 and 125:1 alkali metal nitrate to monoammonium phosphate.

14. The composition of claim 13 wherein the alkali metal is sodium.

15. The composition of claim 13 wherein the bacterium is *Pseudomonas putida*.

16. A method for degradation of a biodegradable material which comprises:
  (a) providing a composition which consists essentially of
    (1) water;
    (2) at least one species of the Pseudomonas bacterium at between about $10^6$ and $10^{10}$ CFU per ml of the water; and
    (3) an alkali metal nitrate in an amount between about 0.1 and 5% by weight of the water and a buffering amount of monoammonium phosphate, wherein the monoammonium phosphate is included in a weight ratio between about 1 to 1 and 125:1 alkali metal nitrate to monoammonium phosphate, so that the bacterium is preserved in living form at 25° C.;
  (b) holding the composition at a temperature between about 8 and 35° C. to provide a preserved bacterium;
  (c) inoculating the preserved bacterium into the biodegradable material; and
  (d) degrading the biodegradable material with the preserved bacterium.

17. The method of claim 16 wherein the alkali metal is sodium.

18. The method of claim 16 wherein the bacterium is *Pseudomonas putida*.

19. The method of claim 16 wherein the biodegradable material is in an organic waste.

20. The method of claim 19 wherein the organic waste is in the environment.

\* \* \* \* \*